Aug. 23, 1960     E. P. HARRIS     2,949,956

SEAT CONSTRUCTION

Filed July 16, 1957

INVENTOR.
Edward P. Harris
BY
His Attorney

United States Patent Office 2,949,956
Patented Aug. 23, 1960

2,949,956

SEAT CONSTRUCTION

Edward P. Harris, Dayton, Ohio, assignor to General Motors Corporation, Detroit, Mich., a corporation of Delaware Filed July 16, 1957, Ser. No. 672,153

2 Claims. (Cl. 155—184)

This invention relates to seat construction and more particularly to a vehicular seat construction utilizing a foamed elastomer as a cushioning agent.

It is an object of this invention to provide an efficient, economical and relatively simple seat construction wherein a resilient pad is supported by a flexible sheet supported between spaced rigid support members and having an elastic sector therein to provide the sheet with predetermined spring characteristics. A further object of the invention is to locate the elastic sector so as to align it vertically substantially with the center of gravity of the seat occupant whereby the seat construction is provided with improved shock dampening characteristics and lateral stability. Still a further object of the invention is to provide a seat construction wherein rigidly raised portions of an automobile floor pan are effectively utilized in resiliently supporting a resilient seat cushion.

Further objects and advantages of the present invention will be apparent from the following description, reference being had to the accompanying drawings wherein a preferred embodiment of the invention is clearly shown.

The invention will now be described in terms of an automobile seat structure although it will be readily apparent that the invention may readily be utilized in connection with other vehicle seats and household furniture such as chairs, davenports, and the like.

Figure 1:
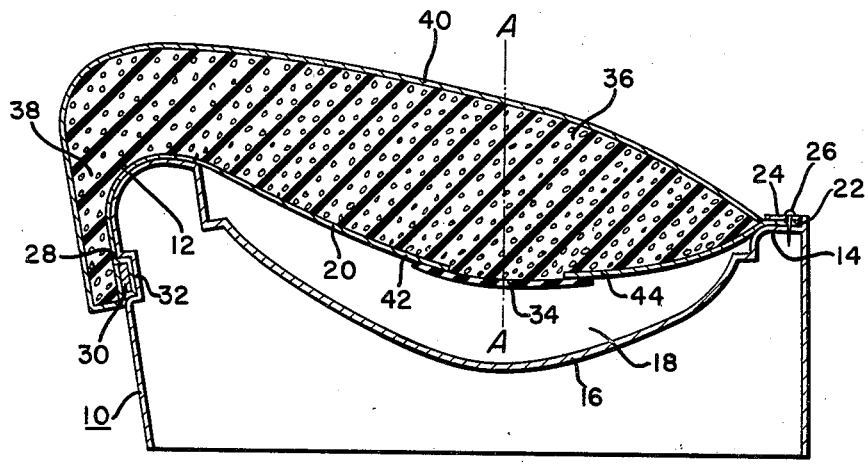
Fig. 1 is a cross sectional side view of a seat construction embodying the present invention.

Referring now to Fig. 1 of the drawings, a seat is shown embodying the invention which includes a rigid supporting frame 10 including a raised elongated forward support portion 12 and a raised rearward support portion 14 disposed in a parallelly spaced relation. In the embodiments shown, the supporting frame 10 is preferably formed as a portion of the automobile floor pan wherein the elongated fore and aft support portions 12 and 14 are interconnected by a sheet portion 16 which is depressed downwardly to form a relatively deep well 18 between the support portions 12 and 14 respectively. The suporting frame 10 may conveniently be formed of a single stamping integrally with the car body.

Suspended between the fore and aft support portions 12 and 14 respectively, and over the well 18 is a flexible sheet 20, the rearward edge 22 of which is fastened to the rearward support portion 14 by means of an elongated bar or plate 24 and screws 26 or other suitable means, and the forward edge 28 of which is firmly secured to a vertical side of the forward support portion 12 by means of a bar or plate 30 located within a recess 32 thereof.

The flexible sheet 20 is preferably formed of a relatively non-elastic, strong fabric such as a 10 ounce duck cloth or a canvas and is provided with a longitudinal sector 34 extending preferably substantially across the width of the seat structure and being formed of a resilient elastic material such as rubber which is preferably disposed along a vertical plane "A" representing the plane along which the center of gravity of an occupant positioned on the seat structure. Disposed over the suspended sheet 20 is a resilient elastomeric foam cushion 36 preferably having a maximum thickness in the vicinity of the plane "A" and having a portion 38 of substantial thickness overhanging the forward support 12. A suitably attractive cover layer 40 is provided over the cushion 36 which is preferably secured to the forward support portion 12 and the rearward support portion 14 by means of the bars 30 and 24 respectively to securely hold the cushion 36 in position. The sheet 20 may further be bonded to the cushion 36, and in an efficient manufacturing process, the cushion 36 may be formed of a suitably foamable material molded against and bonded to the sheet 20.

An important feature of the invention resides in the elastic segment 34 of the sheet 20. A suitable elastic foam seat cushion may be formed of a latex foam and preferably of a relatively soft polyurethane foam such as is disclosed in the copending application, Serial No. 672,650 Harris et al., filed July 18, 1957, assigned to the assignee of the present invention and filed concurrently herewith, having desirable load deflection characteristics wherein a penetration of 3–4 inches into the seat cushion by an occupant will provide a desirable hand "feel" and comfortable seating. However the seat cushion in itself is not adequate to provide a desired resilience or rideability for shock resulting from operating the motor vehicle over relatively rough roads. The elastic segment 34, positioned in the vicinity of the center of gravity of the seat occupant tends to stretch primarily in the area of the weight load thereagainst and thus provides a resilience which is superior to that effected by metal springs or the like of prior art constructions. This results from the fact that the portions of the seat surrounding the occupant will not stretch appreciably in the former construction whereby a pocket is formed into which the occupant settles while being supported by the seat portions surrounding the occupant whereas in the prior art construction involving metal springs, the area surrounding the occupant is also depressed to a considerable extent whereby the occupant is not provided with the surrounding supporting effect, and the metal spring members exert a far greater reactive force.

Figure 2:
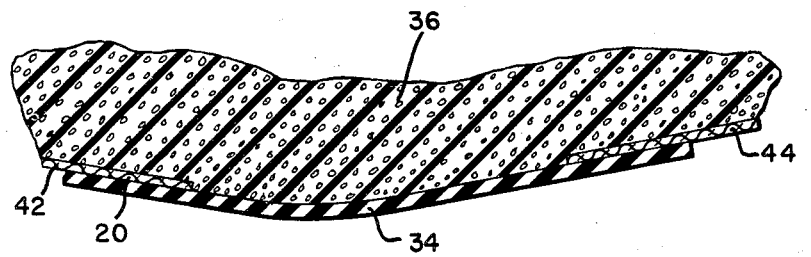
Fig. 2 is an enlarged fragmentary view of a portion of the construction shown in Fig. 1.

The elastic segment 34 may be varied in width and thickness to provide an optimum resilient effect. As shown in Fig. 2 of the drawings, the supporting sheet 20 may suitably be formed by first forming the sheet into two segments 42 and 44 respectively and then joining these segments by bonding the elastomeric segment 34 thereto, a sufficient overlap being provided between the two parts to provide suitably strong joints.

In constructing the support member 10 as a portion of the floor pan, the depth of the well 18 is sufficient to allow for the maximum deflection of the pad 36 of the supporting sheet 20 resulting in the operation of the motor vehicle over rough roads. It may readily be seen that the structure of the present invention provides for a simple and economical manufacture of motor vehicle seats since the supporting frame 10 may be readily formed in the course of the manufacture of the car body and the portion of the seat construction including the cushion 36 and the supporting sheet 20 and the cover layer 40 may be readily fastened thereon as a unit. Moreover it may be readily removed and reinstalled to permit simple and efficient application of seat coverings and the like. Obviously in place of the floor pan 10 shown in the drawings, other frame constructions may be used which provide rigid fore and aft supports.

By the term elastomeric as used herein is meant any of the rubber-like materials such as natural rubber, butadiene-styrene copolymer, butadiene-acrylonitrile copolymer, butyl rubber, polychloroprene, polysulphide rubbers and mixtures of these and other suitable materials suitably compounded to provide seat material having a desirable strength and elasticity.

While the embodiments of the present invention constitute a preferred form, it is to be understood that other forms might be adopted.

What is claimed is as follows:

1. A seat comprising a front support, a rear support in parallel spaced relation with said front support, a flexible sheet suspended between said supports, said sheet including a first relatively non-elastic sheet connected to the front support, a second relatively non-elastic sheet secured to the rear support and a flexible member joining said first and second non-elastic sheets at their free edges, a resilient cushion extending between said front support and said rear support over said elastic sheet with the point of maximum thickness of said cushion and the flexible member vertically aligned rearwardly of a central vertical plane between the front and the rear supports.

2. A seat as defined in claim 1 wherein said resilient cushion is a polyurethane foam material.

References Cited in the file of this patent

UNITED STATES PATENTS

| | | |
|---|---|---|
| 2,231,346 | Reising et al. | Feb. 11, 1941 |
| 2,272,885 | Rathbun | Feb. 10, 1942 |
| 2,527,635 | Hoffman | Oct. 31, 1950 |
| 2,371,954 | Cunningham | Mar. 20, 1954 |
| 2,785,739 | McGregor et al. | Mar. 19, 1957 |